United States Patent
Larsson et al.

(10) Patent No.: US 12,330,484 B2
(45) Date of Patent: Jun. 17, 2025

(54) VEHICLE DOOR SYSTEM AND A METHOD FOR IMPROVING DURABILITY OF A DOOR SYSTEM

(71) Applicants: Ningbo Geely Automobile Research & Development Co., Ltd., Ningbo (CN); Zhejiang Geely Holding Group Co., Ltd., Zhejiang (CN)

(72) Inventors: Martin Larsson, Älvängen (SE); Martin Svensson, Kullavik (SE); Henrik Grammahage, Torslanda (SE)

(73) Assignees: Ningbo Geely Automobile Research & Dev. Co., Ltd., Ningbo (CN); Zhejiang Geely Holding Group Co., Ltd., Zhejiang (CN)

( * ) Notice: Subject to any disclaimer, the term of this patent is extended or adjusted under 35 U.S.C. 154(b) by 269 days.

(21) Appl. No.: 18/078,963

(22) Filed: Dec. 11, 2022

(65) Prior Publication Data
US 2023/0107729 A1     Apr. 6, 2023

Related U.S. Application Data (63) Continuation of application No. PCT/CN2021/100323, filed on Jun. 16, 2021.

(30) Foreign Application Priority Data

Jun. 30, 2020  (EP) .................................... 20183037

(51) Int. Cl.
*B60J 5/04* (2006.01)
(52) U.S. Cl.
CPC ............. *B60J 5/0443* (2013.01); *B60J 5/043* (2013.01); *B60J 5/0437* (2013.01); *B60J 5/0461* (2013.01)

(58) Field of Classification Search
CPC ........ B60J 5/043; B60J 5/0443; B60J 5/0458; B60J 5/04; B60J 5/042; B60J 5/06;
(Continued)

(56) References Cited

U.S. PATENT DOCUMENTS

| 4,462,633 A | 7/1984 | Maeda |
| 5,700,049 A * | 12/1997 | Shibata .................. B62D 24/02 296/203.03 |

(Continued)

FOREIGN PATENT DOCUMENTS

| CN | 101270628 A | 9/2008 |
| CN | 202345341 U | 7/2012 |

(Continued)

OTHER PUBLICATIONS

International Search Report from International Application No. PCT/CN2021/100323, mailed Aug. 13, 2021, 3 pages.

*Primary Examiner* — Amy R Weisberg
*Assistant Examiner* — Denise Lynne Esquivel
(74) *Attorney, Agent, or Firm* — Tucker Ellis LLP (57) ABSTRACT

A door system for a vehicle includes a vehicle body structure and a first door structure. The first door structure includes a first door beam extending between a lower part and an upper part of the vehicle body structure when the first door structure is closed. The first door beam includes a first engaging part arranged to interact with an essentially correspondingly shaped first receiving guide rail when the first door structure is in the closed position. The first receiving guide rail extends in a lateral direction of the vehicle body structure, aligned with an extension of a first cross member extending in a lateral direction of the vehicle body structure. Upon a side collision, the first door beam is arranged to engage with the first cross member and the receiving guide (Continued)

rail is arranged to prevent the first engaging part from moving in a vertical direction.

15 Claims, 6 Drawing Sheets

(58) Field of Classification Search
CPC ...... B60J 5/0479; B60J 5/0437; B60J 5/0461; B60J 2005/0475; B60J 2005/0479; B62D 25/02; B62D 25/025; B62D 25/06
USPC .......................... 296/146.6, 187.08, 187.12
See application file for complete search history.

(56) References Cited

U.S. PATENT DOCUMENTS

| | | |
|---|---|---|
| 6,332,641 B1 | 12/2001 | Okana |
| 6,983,981 B2 | 1/2006 | Saeki |
| 2007/0169415 A1 | 7/2007 | Jain |
| 2012/0049580 A1 | 3/2012 | Konchan |
| 2012/0319388 A1 | 12/2012 | Ishii |
| 2015/0368941 A1 | 12/2015 | Schoch |

FOREIGN PATENT DOCUMENTS

| | | | |
|---|---|---|---|
| CN | 203640550 U | | 6/2014 |
| CN | 107031531 A | | 8/2017 |
| CN | 111301124 A | | 6/2020 |
| DE | 202010003634 U1 | | 7/2011 |
| DE | 102012108180 A1 | | 5/2014 |
| EP | 1068970 A1 | | 1/2001 |
| FR | 2917048 A1 | | 12/2008 |
| GB | 2408025 A | | 5/2005 |
| JP | 2007138666 A | * | 6/2007 |
| JP | 2007161043 A | | 6/2007 |
| JP | 2009023573 A | | 2/2009 |
| KR | 100804467 B1 | | 2/2008 |
| KR | 20190143692 A | | 12/2019 |

* cited by examiner

VEHICLE DOOR SYSTEM AND A METHOD FOR IMPROVING DURABILITY OF A DOOR SYSTEM

RELATED APPLICATION DATA

This application is a continuation of International Patent Application No. PCT/CN2021/100323, filed Jun. 16, 2021, which claims the benefit of European Patent Application No. 20183037.9, filed Jun. 30, 2020, the disclosures of which are incorporated herein by reference in their entireties.

TECHNICAL FIELD

The disclosure relates to a method for improving durability of a door system and a vehicle door system for a vehicle comprising a vehicle body structure and a first door structure. The vehicle body structure comprises an opening to an interior compartment of the vehicle. The door system comprises a displacement mechanism configured for displacing the first door structure in relation to the opening between an open position and a closed position. The first door structure in the closed position is arranged to cover at least a portion of the opening. The first door structure in the open position is arranged at a distance from the closed position in a longitudinal direction of the vehicle body structure. The first door structure comprises a first door beam arranged to extend between a lower part of the vehicle body structure and an upper part of the vehicle body structure when the first door structure is arranged in a closed position.

BACKGROUND

Vehicle doors may be opened in a number of different ways. One technical solution is to provide sliding front and rear doors. This solution results in the removal of the B-pillar that is welded to the vehicle body. In order to fulfill the requirements of side impact tests performed by e.g. Euro NCAP and US NCAP, the forces normally absorbed by or transferred by the B-pillar during a collision has to be managed.

U.S. Pat. No. 6,332,641 B1 discloses a vehicle without B-pillar where the doors are opened outwards, i.e. where the rear door is a so-called suicide door. Reinforcing members are provided near joint surfaces of the front door and the rear door in order to absorb forces from an impact caused by side collision.

SUMMARY

An objective of the disclosure is to provide a vehicle door system and a method addressing the issues raised.

The disclosure relates to a door system for a vehicle comprising a vehicle body structure and a first door structure. The vehicle body structure comprises an opening to an interior compartment of the vehicle. The door system comprises a displacement mechanism configured for displacing the first door structure in relation to the opening between an open position and a closed position. The first door structure in the closed position is arranged to cover at least a portion of the opening. The first door structure in the open position is arranged at a distance from the closed position in a longitudinal direction of the vehicle body structure. The first door structure comprises a first door beam arranged to extend between a lower part of the vehicle body structure and an upper part of the vehicle body structure when the first door structure is arranged in a closed position. The first door beam comprises a first engaging part arranged at a lower end of the first door beam, wherein the first engaging part is arranged to interact with an essentially correspondingly shaped first receiving guide rail arranged in the vehicle body structure when the first door structure is in the closed position. The first receiving guide rail has an extension in a lateral direction of the vehicle body structure, wherein the extension of the first guide rail is aligned with an extension of a first cross member of the vehicle body structure extending in a lateral direction of the vehicle body structure. Upon a side collision, the first door beam is arranged to engage with the first cross member and the receiving guide rail is arranged to prevent the first engaging part from moving in a vertical direction.

An advantage with the door system according to the disclosure is that it improves the durability of a vehicle door during a side impact. Having a first engaging part arranged in the door beam of the first door structure arranged to interact with an essentially correspondingly shaped first receiving guide rail arranged in the vehicle body structure provides a way for the door beam in the door structure to provide structural integrity to a vehicle without a B-pillar. During a side impact, the first door beam is arranged to engage with a first cross member of the vehicle body structure. The first cross member thereby absorbs the force of the side impact transferred by the first door beam when the first door structure is deformed during the impact. The first receiving guide rail guides the first engaging part such that the first door beam of the first door structure towards the first cross member and also prevents the first engaging part, and thereby the entire door structure, from moving in a vertical direction. This combination of features leads to improved collision durability.

The door system may comprise a first bracket comprising the first engaging part being attached to the lower end of the first door beam, such that the first bracket engages with and is wedged in the first cross member upon a side collision.

With a bracket comprising the first engaging part, it is possible to design the first engaging part to specific vehicle design and to adapt the bracket to meet specific impact criteria.

A height of the first bracket may be smaller than a distance between the first receiving guide rail and an upper outer part of the first cross member such that a movement in a vertical direction of the first door beam relative the vehicle body structure is restricted upon the first bracket being wedged in the first cross member.

As it is important for the vehicle door to not separate from the vehicle body, having a bracket with a height smaller than a distance between the first receiving guide rail and an upper outer part of the first cross member ensures that when the first bracket engages with the first cross member increases the durability of the vehicle during a side impact.

The first engaging part may be essentially T-shaped and the first receiving guide rail may have an essentially correspondingly shaped receiving cross section.

One of the functions of the door system is to ensure that the door structure does not separate from the vehicle body structure to ensure structural integrity during and after the side impact. By having a first engaging part that is essentially T-shaped and a first receiving guide rail with an essentially correspondingly shaped receiving cross section, the shape of the first engaging part and the first receiving guide rail interact to ensure that the first engaging part when being guided in the first receiving guide rail during a side impact, is prevented from moving in a vertical direction.

The door system may comprise a second door structure, wherein the door system comprises a displacement mechanism configured for displacing the second door structure in relation to the opening between an open position and a closed position, wherein the second door structure in the closed position is arranged to cover at least a portion of the opening, and wherein the second door structure in the open position is arranged at a distance from the closed position in a longitudinal direction of the vehicle body structure, wherein the second door structure comprises a second door beam arranged to extend between a lower part of the vehicle body structure and an upper part of the vehicle body structure when the second door structure is arranged in a closed position, wherein the second door beam comprises a second engaging part arranged at a lower end of the second door beam, wherein the second engaging part is arranged to interact with an essentially correspondingly shaped second receiving guide rail arranged in the vehicle body structure when the second door structure is in the closed position, wherein the second receiving guide rail has an extension in a lateral direction of the vehicle body structure, wherein the extension of the second guide rail is aligned with an extension of a second cross member of the vehicle body structure extending in a lateral direction of the vehicle body structure, wherein, upon a side collision, the second door beam is arranged to engage with the second cross member and the second receiving guide rail is arranged to prevent the second engaging part from moving in a vertical direction.

A vehicle may comprise apart from a first door structure, a second door structure comprising the same parts as the first door structure. The advantage with having a second door structure is that the durability of the vehicle door system is increased as the vehicle will have two door structures that can disperse the force of a side impact. Also, having a first door structure and a second door structure that each is arranged to increase the durability of the door system ensures that a vehicle during a side impact that completely or mostly affects one of the door structures will live up to the requirements of side impact safety standards. Otherwise, the advantages with the second door structure are the same as described for the first door structure above.

The door system may comprise a second bracket comprising the second engaging part attached to the lower end of the second door beam, such that the second bracket engages with and is wedged in the second cross member upon a side collision.

With a bracket comprising the second engaging part, it is possible to design the second engaging part to specific vehicle design and to adapt the bracket to meet specific impact criteria. For instance, the first and second engaging part does not have to have the same design but can be adapted for being front and rear door structure.

A height of the second bracket may be smaller than a distance between the second receiving guide rail and an upper outer part of the second cross member such that a movement in a vertical direction of the second door beam relative the vehicle body structure is restricted upon the second bracket being wedged in the second cross member.

The advantages are the same as described for the first bracket above.

The second engaging part may be essentially T-shaped and the second receiving guide rail may have an essentially correspondingly shaped receiving cross section.

The advantages are the same as described for the first engaging part and first receiving guide rail above.

The disclosure also relates to a vehicle comprising a door system according to the above description.

The disclosure also relates to a method for improving durability of a door system in a vehicle, the door system comprising a vehicle body structure and a first door structure, the vehicle body structure comprising an opening to an interior compartment of the vehicle, wherein the door system comprises a displacement mechanism configured for displacing the first door structure in relation to the opening between an open position and a closed position, wherein the first door structure in the closed position is arranged to cover at least a portion of the opening, and wherein the first door structure in the open position is arranged at a distance from the closed position in a longitudinal direction of the vehicle body structure, wherein the method comprises the steps:
 providing the first door structure with a first door beam arranged to extend between a lower part of the vehicle body structure and an upper part of the vehicle body structure when the first door structure is arranged in a closed position,
 providing the first door beam with a first engaging part arranged at a lower end of the first door beam,
 providing a first receiving guide rail arranged in the lower part of the vehicle body structure having an extension in a lateral direction of the vehicle body structure with a shape corresponding to the first engaging part of the first door beam,
 aligning the extension of the first receiving guide rail with an extension of a first cross member of the vehicle body structure extending in a lateral direction of the vehicle body structure,
 wherein the first engaging part is arranged to interact with the correspondingly shaped first receiving guide rail when the first door structure is in the closed position,
 wherein, upon a side collision, the first door beam is arranged to engage with the first cross member and the first receiving guide rail is arranged to prevent the first engaging part from moving in a vertical direction.

The advantages of the method are the same as for the door system as described above.

The method may comprise the step:
 attaching a first bracket comprising the first engaging part to the lower end of the first door beam, such that the first bracket engages with and is wedged in the first cross member upon a side collision.

The method may comprise the step:
 providing the first bracket with a height smaller than a distance between the first receiving guide rail and an upper outer part of the first cross member such that a movement in a vertical direction of the first door beam relative the vehicle body structure is restricted upon the first bracket being wedged in the first cross member.

Wherein the door system comprises a second door structure, wherein the door system comprises a displacement mechanism configured for displacing the second door structure in relation to the opening between an open position and a closed position, wherein the second door structure in the closed position is arranged to cover at least a portion of the opening, and wherein the second door structure in the open position is arranged at a distance from the closed position in a longitudinal direction of the vehicle body structure, the method may comprise the steps:
 providing the second door structure with a second door beam arranged to extend between a lower part of the vehicle body structure and an upper part of the vehicle body structure when the second door structure is arranged in a closed position,
 providing the second door beam with a second engaging part arranged at a lower end of the second door beam, providing a second receiving guide rail arranged in the lower part of the vehicle body structure having an extension in a lateral direction of the vehicle body structure with a shape corresponding to the second engaging part of the second door beam, aligning the extension of the second receiving guide rail with an extension of a second cross member of the vehicle body structure extending in a lateral direction of the vehicle body structure, wherein the second engaging part is arranged to interact with the correspondingly shaped second receiving guide rail when the second door structure is in the closed position, wherein, upon a side collision, the second door beam is arranged to engage with the second cross member and the second receiving guide rail is arranged to prevent the second engaging part from moving in a vertical direction.

The method may comprise the step:

attaching a second bracket comprising the second engaging part to the lower end of the second door beam, such that the second bracket engages with and is wedged in the second cross member upon a side collision.

The method may comprise the step:

providing the second bracket with a height smaller than a distance between the second receiving guide rail and an upper outer part of the second cross member such that a movement in a vertical direction of the second door beam relative the vehicle body structure is restricted upon the second bracket being wedged in the second cross member.

DETAILED DESCRIPTION

Figure 1:
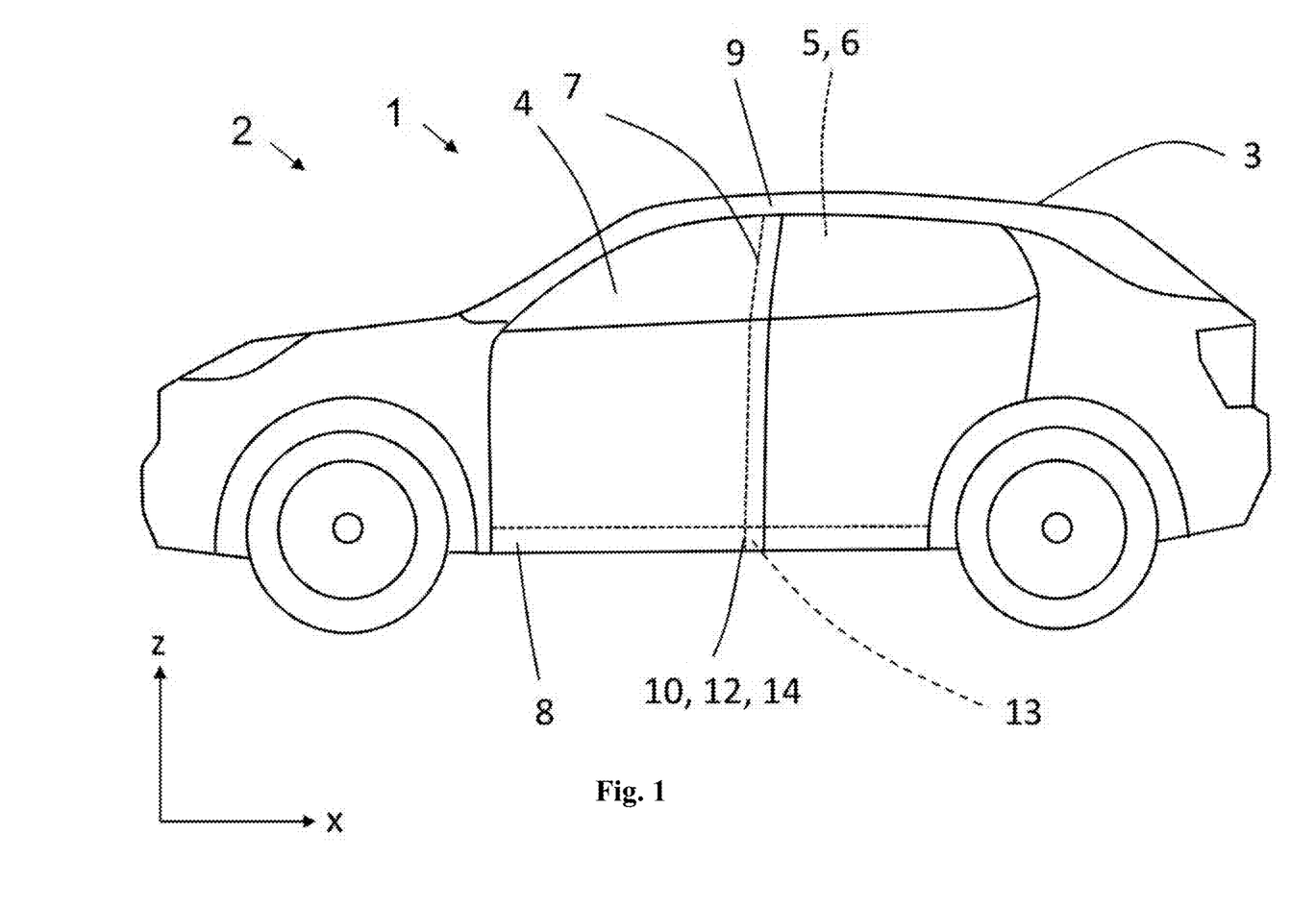
FIG. 1 schematically shows a vehicle comprising a door system according to the disclosure, FIG. 2 schematically shows a cross sectional view of a door structure of the door system according to the disclosure, FIG. 3 schematically shows a cross sectional view of a door structure of the door system according to the disclosure during a side impact, FIG. 4 schematically shows a cross sectional view of a door structure of the door system according to the disclosure in the late stage of a side impact, FIG. 5 schematically shows a cross sectional view of the first engaging part and the correspondingly shaped first receiving guide rail, FIG. 6 schematically shows a vehicle comprising a door system according to a further embodiment of the disclosure.

FIG. 1 schematically shows a vehicle 1 comprising a door system 2 according to the disclosure. The vehicle 1 has a length extension in a longitudinal or x-direction, a width extension in a lateral, transverse or y-direction and a height extension in a vertical or z-direction.

The door system 2 comprises a vehicle body structure 3 and a first door structure 4. The vehicle body structure 3 comprises an opening 5 to an interior compartment 6 of the vehicle 1. The door system 2 comprises a displacement mechanism (not shown) configured for displacing the first door structure 4 in relation to the opening 5 between an open position and a closed position. The first door structure 4 is in the closed position arranged to cover at least a portion of the opening 5. The first door structure 4 is in the open position arranged at a distance from the closed position in the longitudinal direction of the vehicle body structure 3. The first door structure 4 comprises a first door beam 7 arranged to extend between a lower part 8 of the vehicle body structure 3 and an upper part 9 of the vehicle body structure 3 when the first door structure 4 is arranged in a closed position.

Examples of door structures that can take advantage of the door system 2 according to the disclosure are door structures with at least one sliding door, scissor door or butterfly door but other examples are also possible.

Schematically shown in FIG. 1, the first door beam 7 comprises a first engaging part 10 arranged at a lower end 11 of the first door beam 7. The first engaging part 10 is arranged to interact with an essentially correspondingly shaped first receiving guide rail 12 arranged in the vehicle body structure 3 when the first door structure 4 is in the closed position. The first receiving guide rail 12 has an extension in a lateral or y-direction of the vehicle body structure 3, wherein the extension of the first guide rail is aligned with an extension of a first cross member 13 of the vehicle body structure 3 extending in a lateral or y-direction of the vehicle body structure 3. The first cross member 13 may for instance be a cross member arranged to support a seat or a cross member arranged in a floor structure of the vehicle body structure 3. Upon a side collision, the first door beam 7 is arranged to engage with the first cross member 13 and the receiving guide rail is arranged to prevent the first engaging part 10 from moving in a vertical or z-direction.

Figure 2:
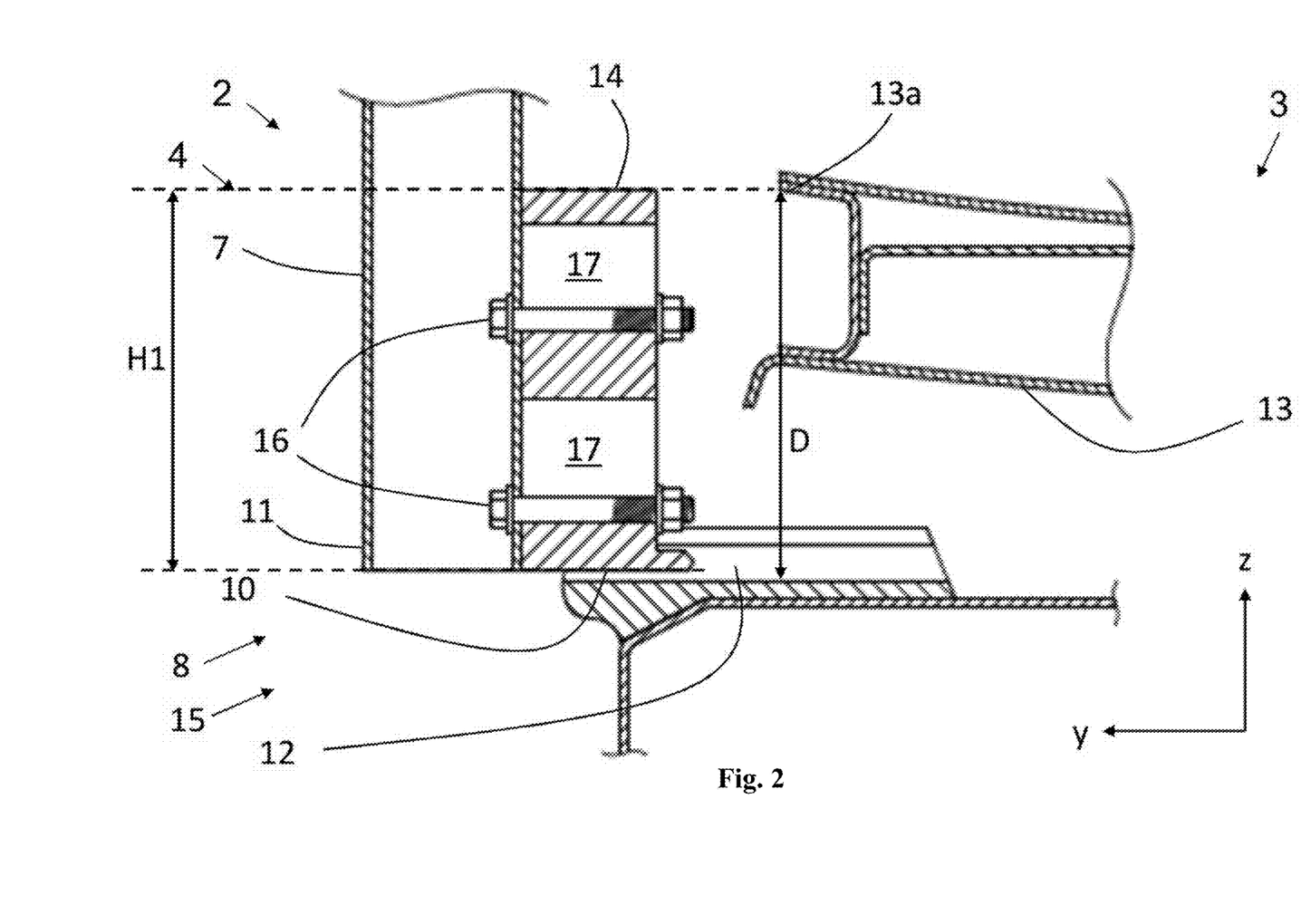

FIG. 2 schematically shows a cross sectional view of the first door structure 4 of the door system 2 according to the disclosure. In this example, the view is a close up view of the first door structure of a vehicle 1 as seen from the rear of the vehicle 1 looking towards the front, as it is a left side door. For a right side door, the features will be mirrored with possible changes in designs depending on if the door is a driver door and a passenger door or if the door is a rear door or a front door.

The first door structure 4 comprises the first door beam 7 and a first bracket 14 attached to the first door beam 7. The exterior parts of the door have been removed for clarity. At a bottom end 15 of the first bracket 14, the first engaging part 10 can be seen. It is also possible for the first engaging part 10 to be an integral part of the first door beam 7, i.e. the first engaging part 10 is arranged at a bottom end of the first door beam 7.

In this example, the first engaging part 10 is arranged on the first bracket 14 and the first bracket 14 is attached to a lower end 11 of the first door beam 7 by means of first attachment means 16. The first attachment means 16 are arranged in essentially vertical grooves 17. The number of first attachment means 16, and thereby the number of essentially vertical grooves 17 may be more than two as shown in the figure or only one, depending on the design.

A height H1 of the first bracket 14 is smaller than a distance D between the first receiving guide rail 12 and an upper outer part 13a of the first cross member 13.

In FIG. 2, the door structure is in the closed position and the first engaging part 10 is interacting with the essentially correspondingly shaped first receiving guide rail 12 arranged in the vehicle body structure 3. The first receiving guide rail 12 has an extension along the y-direction or in the lateral direction of the vehicle body structure 3. The extension of the first guide rail is aligned with an extension of the first cross member 13 of the vehicle body structure 3 extending in the y-direction or in a lateral direction of the vehicle body structure 3.

Figure 3:
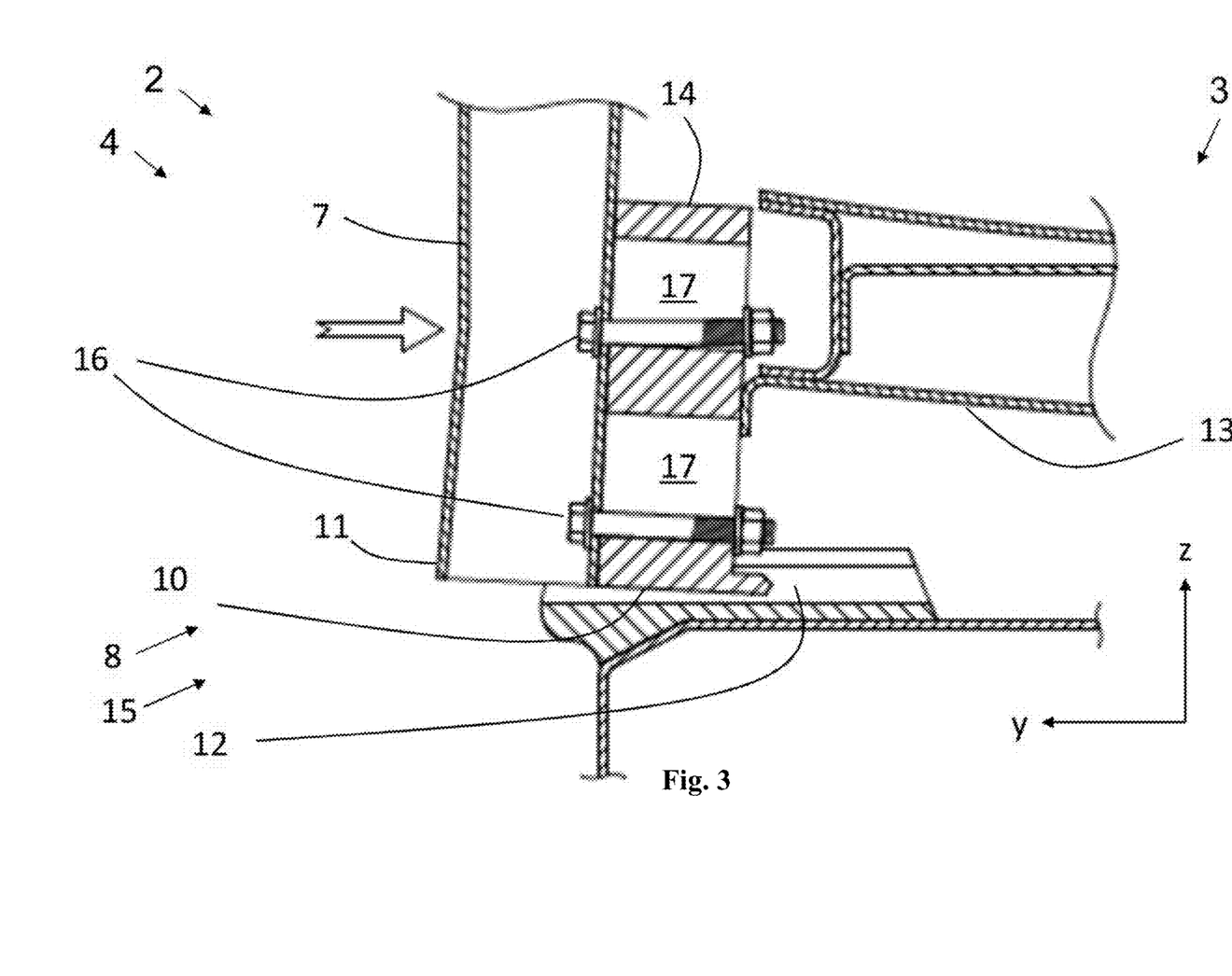

FIG. 3 schematically shows a cross sectional view of a door structure of the door system 2 according to the disclosure during a side impact. In FIG. 3, a side impact is illustrated by an arrow indicating a side impact force. As can be seen in the figure, the first door beam 7 has started to buckle and moves in the lateral or y-direction towards a centre of the vehicle 1 under the impact force. The first bracket 14, being attached to the first door beam 7, has thereby moved in the first receiving guide rail 12 by the interaction between the first engaging part 10 and the first guiding rail. In the figure, the first door beam 7 by means of the first bracket 14 has started to engage with the first cross member 13.

Correspondingly, if the first engaging part 10 were an integral part of the first door beam 7, the door beam would have started to engage with the first cross member 13.

Figure 4:
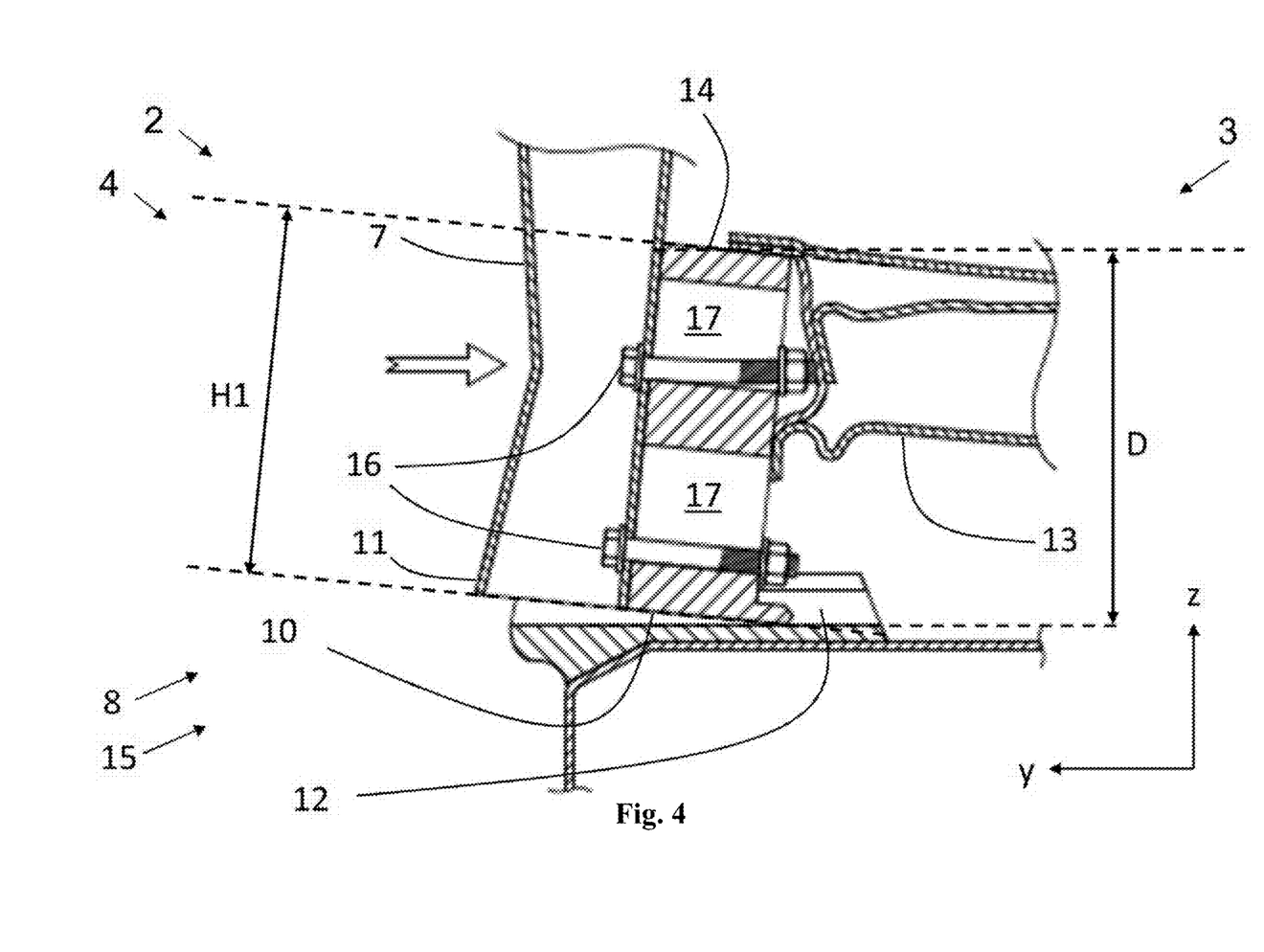

FIG. 4 schematically shows a cross sectional view of a door structure of the door system 2 according to the disclosure in the late stage of a side impact. In the figure, the first bracket 14 has engaged with the first cross member 13. As can be seen, as the height H1 of the first bracket 14 is smaller than the distance D between the first receiving guide rail 12 and the upper outer part 13a of the first cross member 13, a movement in a vertical direction or z-direction of the first door beam 7 relative the vehicle body structure 3 is restricted upon the first bracket 14 being wedged in the first cross member 13.

Further, the first attachment means 16 have moved inside the essentially vertical grooves 17 allowing the first bracket 14 to rotate slightly. This can be seen by that the first attachment means 16 have separated slightly from a bottom part of the essentially vertical grooves 17.

In FIGS. 2-4, the design of the first cross member 13 to be seen as one example disclosure. The design of the first cross member 13 may be different as long as the height H1 of the first bracket 14 is smaller than the distance D between the first receiving guide rail 12 and the upper outer part 13a of the first cross member 13, thereby restricting the movement in a vertical direction or z-direction of the first door beam 7 relative the vehicle body structure 3 upon the first bracket 14 being wedged in the first cross member 13.

Figure 5:
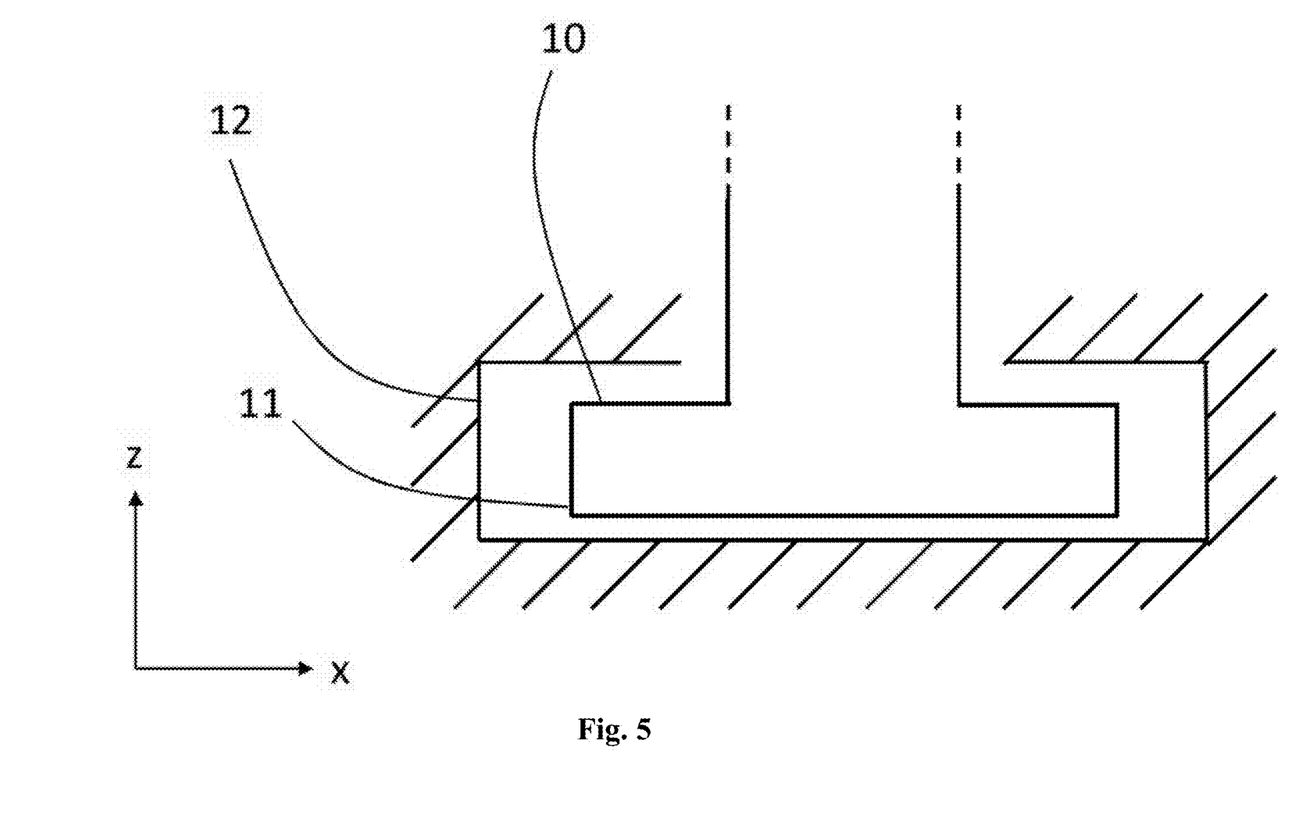

FIG. 5 schematically shows a cross sectional view of the first engaging part 10 and the correspondingly shaped first receiving guide rail 12. In the figure, it can be seen that the first engaging part 10 fits inside the first receiving guide rail 12. In the example of FIG. 5, the first engaging part 10 is essentially T-shaped, e.g. has a T-shaped cross section, and the first receiving guide rail 12 has an essentially correspondingly shaped receiving cross section. The distance between the first engaging part 10 and the first receiving guide rail 12 are shown for illustrative purposes. As an alternative to the T-shape of the first engaging part 10, the first engaging part 10 can have a spherical cross section with the first receiving guide rail 12 having an essentially correspondingly shaped receiving cross section. It is of course possible for further alternative shapes for the cross sections of the first engaging part 10 and the first receiving guide rail 12 to fulfill the desired function as described above.

As can be seen from the figure, the design of the first receiving guide rail 12 and the first engaging part 10 prevents the first engaging part 10 from moving in a vertical direction, i.e. in the z-direction. Additionally, the first engaging part 10 is further prevented from moving in a longitudinal direction, i.e. in the x-direction. This prevents the first door structure 4 from moving forwards or rearwards in case the side impact is at an angle relative the longitudinal direction of the vehicle 1.

Figure 6:
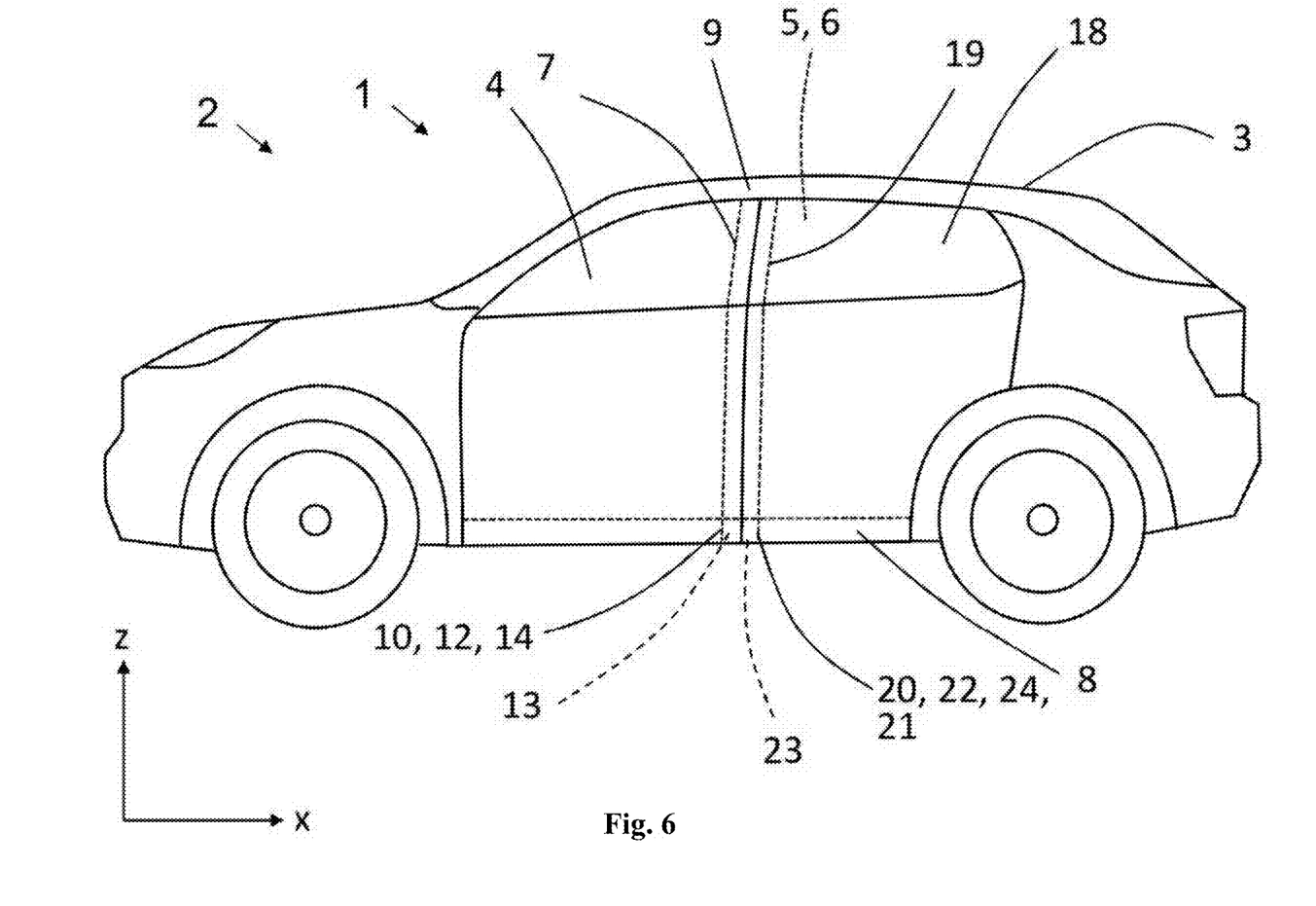

FIG. 6 schematically shows a vehicle 1 comprising a door system 2 according to a further embodiment of the disclosure. The door system 2 further comprises a second door structure 18 similar to the first door structure 4. The door system 2 comprises a displacement mechanism (not shown) configured for displacing the second door structure 18 in relation to the opening 5 between an open position and a closed position, wherein the second door structure 18 in the closed position is arranged to cover at least a portion of the opening 5. The second door structure 18 in the open position is arranged at a distance from the closed position in a longitudinal direction of the vehicle body structure 3.

The second door structure 18 comprises a second door beam 19 arranged to extend between a lower part 8 of the vehicle body structure 3 and an upper part 9 of the vehicle body structure 3 when the second door structure 18 is arranged in a closed position. Similar to what has been described above for the first door structure 4, the second door beam 19 comprises a second engaging part 20 arranged at a lower end 21 of the second door beam 19. The second engaging part 20 is arranged to interact with an essentially correspondingly shaped second receiving guide rail 22 arranged in the vehicle body structure 3 when the second door structure 18 is in the closed position. The second door structure 18 comprises a second receiving guide rail 22 having an extension in a lateral direction of the vehicle body structure 3. The extension of the second receiving guide rail 22 is aligned with an extension of a second cross member 23 of the vehicle body structure 3 extending in a lateral direction of the vehicle body structure 3, wherein, upon a side collision, the second door beam 19 is arranged to engage with the second cross member 23 and the second receiving guide rail 22 is arranged to prevent the second engaging part 20 from moving in a vertical direction.

Although not shown in detail, the second door structure may similar to the first door structure comprise a second bracket 24 comprising the second engaging part 20 is attached to the lower end of the second door beam 19, such that the second bracket 24 engages with and is wedged in the second cross member 23 upon a side collision. The second bracket 24 may be attached to the second door beam 19 in the same way as the first bracket 14 is attached to the first door beam 7.

Similar to the first bracket 14, a height of the second bracket 24 may be smaller than a distance between the second receiving guide rail 22 and an upper outer part of the second cross member 23 such that a movement in a vertical direction of the second door beam 19 relative the vehicle body structure 3 is restricted upon the second bracket 24 being wedged in the second cross member 23.

Further similar to the first door structure, the second engaging part 20 may be essentially T-shaped and the second receiving guide rail 22 may have a corresponding essentially T-shaped cross section or the alternative shapes mentioned in conjunction with the first engaging part 10 and the first receiving guide rail 12.

Thus, referring to FIGS. 2-4, the description of the function of the first door structure 4 and the parts it comprises can be applied also to the second door structure 18. Design changes may be necessary in depending on the model of the vehicle 1 and if the second door is the rear or the front door, but the functionality of the second door structure 18 will stay the same as for the first door structure 4.

Although the disclosure has been illustrated and described in detail in the drawings and foregoing description, such illustration and description are to be considered illustrative or exemplary and the disclosure is not limited to the disclosed example embodiments.

REFERENCES

1. Vehicle
2. Door system
3. Vehicle body structure
4. First door structure
5. Opening
6. Interior compartment
7. First door beam
8. Lower part of vehicle body
9. Upper part of vehicle body
10. First engaging part
11. Lower end of first door beam
12. First receiving guide rail
13. First cross member
    a. Upper outer part
14. First bracket
15. Bottom end
16. First attachment means
17. Vertical groove
18. Second door structure
19. Second door beam
20. Second engaging part
21. Lower end of second door beam
22. Second receiving guide rail
23. Second cross member
24. Second bracket

What is claimed is:

1. A door system for a vehicle comprising a vehicle body structure and a first door structure, wherein the vehicle body structure comprises an opening to an interior compartment of the vehicle, wherein the first door structure has an open position and a closed position relative to the opening, wherein the first door structure in the closed position is arranged to cover at least a portion of the opening, and wherein the first door structure in the open position is arranged at a distance from the closed position in a longitudinal direction of the vehicle body structure, wherein the first door structure comprises a first door beam arranged to extend between a lower part of the vehicle body structure and an upper part of the vehicle body structure when the first door structure is arranged in a closed position, wherein the first door beam comprises a first engaging part arranged at a lower end of the first door beam, wherein the first engaging part is arranged to interact with an essentially correspondingly shaped first receiving guide rail arranged in the vehicle body structure when the first door structure is in the closed position, wherein the first receiving guide rail has an extension in a lateral direction of the vehicle body structure, wherein the extension of the first guide rail is aligned with an extension of a first cross member of the vehicle body structure extending in a lateral direction of the vehicle body structure, wherein, upon a side collision, the first door beam is arranged to engage with the first cross member and the receiving guide rail is arranged to prevent the first engaging part from moving in a vertical direction.

2. The door system according to claim 1, wherein a first bracket comprising the first engaging part is attached to the lower end of the first door beam, such that the first bracket engages with and is wedged in the first cross member upon a side collision.

3. The door system according to claim 2, wherein a height of the first bracket is smaller than a distance between the first receiving guide rail and an upper outer part of the first cross member such that a movement in a vertical direction of the first door beam relative to the vehicle body structure is restricted upon the first bracket being wedged in the first cross member.

4. The door system according to claim 1, wherein the first engaging part is essentially T-shaped and the first receiving guide rail has an essentially correspondingly shaped receiving cross section.

5. The door system according to claim 1, wherein the door system comprises a second door structure, wherein the second door structure has an open position and a closed position relative to the opening, wherein the second door structure in the closed position is arranged to cover at least a portion of the opening, and wherein the second door structure in the open position is arranged at a distance from the closed position in a longitudinal direction of the vehicle body structure, wherein the second door structure comprises a second door beam arranged to extend between a lower part of the vehicle body structure and an upper part of the vehicle body structure when the second door structure is arranged in a closed position, wherein the second door beam comprises a second engaging part arranged at a lower end of the second door beam, wherein the second engaging part is arranged to interact with an essentially correspondingly shaped second receiving guide rail arranged in the vehicle body structure when the second door structure is in the closed position, wherein the second receiving guide rail has an extension in a lateral direction of the vehicle body structure, wherein the extension of the second guide rail is aligned with an extension of a second cross member of the vehicle body structure extending in a lateral direction of the vehicle body structure, wherein, upon a side collision, the second door beam is arranged to engage with the second cross member and the second receiving guide rail is arranged to prevent the second engaging part from moving in a vertical direction.

6. The door system according to claim 5, wherein a second bracket comprising the second engaging part is attached to the lower end of the second door beam, such that the second bracket engages with and is wedged in the second cross member upon a side collision.

7. The door system according to claim 6, wherein a height of the second bracket is smaller than a distance between the second receiving guide rail and an upper outer part of the second cross member such that a movement in a vertical direction of the second door beam relative to the vehicle body structure is restricted upon the second bracket being wedged in the second cross member.

8. The door system according to claim 6, wherein the second engaging part is essentially T-shaped and the second receiving guide rail has a corresponding essentially T-shaped cross section.

9. A vehicle comprising a door system according to claim 1.

10. A method for improving durability of a door system in a vehicle, the door system comprising a vehicle body structure and a first door structure, the vehicle body structure comprising an opening to an interior compartment of the vehicle, wherein the first door structure has an open position and a closed position relative to the opening, wherein the first door structure in the closed position is arranged to cover at least a portion of the opening, and wherein the first door structure in the open position is arranged at a distance from the closed position in a longitudinal direction of the vehicle body structure, wherein the method comprises the steps:

providing the first door structure with a first door beam arranged to extend between a lower part of the vehicle body structure and an upper part of the vehicle body structure when the first door structure is arranged in a closed position, providing the first door beam with a first engaging part arranged at a lower end of the first door beam, providing a first receiving guide rail arranged in the lower part of the vehicle body structure having an extension in a lateral direction of the vehicle body structure with a shape corresponding to the first engaging part of the first door beam, aligning the extension of the first receiving guide rail with an extension of a first cross member of the vehicle body structure extending in a lateral direction of the vehicle body structure, wherein the first engaging part is arranged to interact with the correspondingly shaped first receiving guide rail when the first door structure is in the closed position, wherein, upon a side collision, the first door beam is arranged to engage with the first cross member and the first receiving guide rail is arranged to prevent the first engaging part from moving in a vertical direction.

11. The method according to claim 10, wherein the method comprises the step:

attaching a first bracket comprising the first engaging part to the lower end of the first door beam, such that the first bracket engages with and is wedged in the first cross member upon a side collision.

12. The method according to claim 11, wherein the method comprises the step:

providing the first bracket with a height smaller than a distance between the first receiving guide rail and an upper outer part of the first cross member such that a movement in a vertical direction of the first door beam relative to the vehicle body structure is restricted upon the first bracket being wedged in the first cross member.

13. The method according to claim 10, wherein the door system comprises a second door structure, wherein the second door structure has an open position and a closed position relative to the opening, wherein the second door structure in the closed position is arranged to cover at least a portion of the opening, and wherein the second door structure in the open position is arranged at a distance from the closed position in a longitudinal direction of the vehicle body structure, wherein the method comprises the steps:

providing the second door structure with a second door beam arranged to extend between a lower part of the vehicle body structure and an upper part of the vehicle body structure when the second door structure is arranged in a closed position, providing the second door beam with a second engaging part arranged at a lower end of the second door beam, providing a second receiving guide rail arranged in the lower part of the vehicle body structure having an extension in a lateral direction of the vehicle body structure with a shape corresponding to the second engaging part of the second door beam, aligning the extension of the second receiving guide rail with an extension of a second cross member of the vehicle body structure extending in a lateral direction of the vehicle body structure, wherein the second engaging part is arranged to interact with the correspondingly shaped second receiving guide rail when the second door structure is in the closed position, wherein, upon a side collision, the second door beam is arranged to engage with the second cross member and the second receiving guide rail is arranged to prevent the second engaging part from moving in a vertical direction.

14. The method according to claim 13, wherein the method comprises the step:

attaching a second bracket comprising the second engaging part to the lower end of the second door beam, such that the second bracket engages with and is wedged in the second cross member upon a side collision.

15. The method according to claim 14, wherein the method comprises the step:

providing the second bracket with a height smaller than a distance between the second receiving guide rail and an upper outer part of the second cross member such that a movement in a vertical direction of the second door beam relative to the vehicle body structure is restricted upon the second bracket being wedged in the second cross member.

* * * * *